J. B. JONES.
TINNING APPARATUS.
No. 195,510. Patented Sept. 25, 1877.
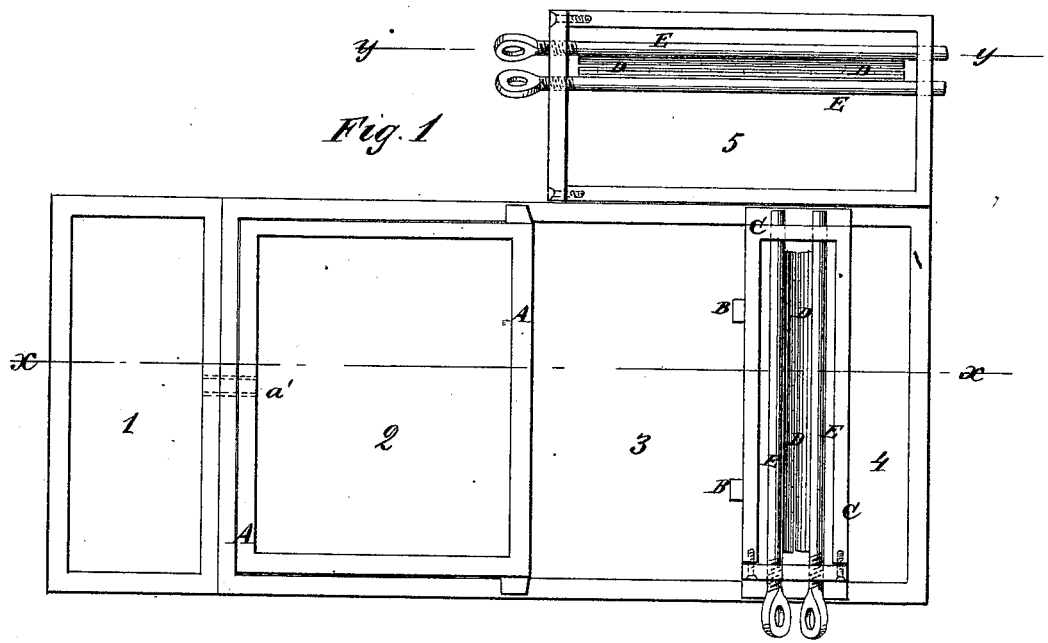
Fig. 1
Fig. 2
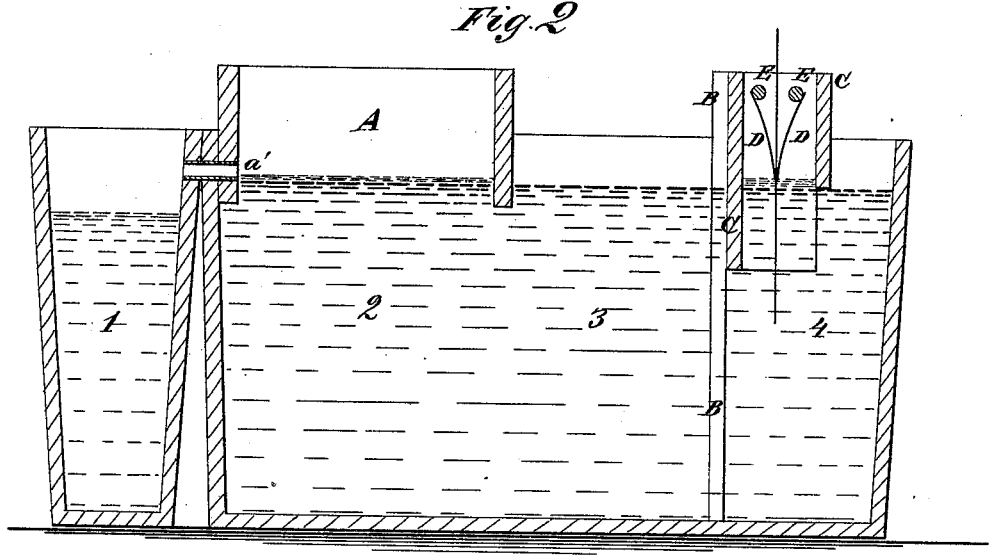
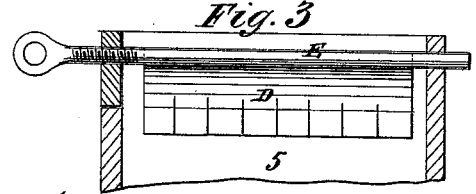
Fig. 3
WITNESSES:
A. W. Almquist
J. H. Scarborough
INVENTOR:
Jno. B. Jones.
BY
ATTORNEYS.

UNITED STATES PATENT OFFICE.

JOHN B. JONES, OF BROOKLYN, NEW YORK.

IMPROVEMENT IN TINNING APPARATUS.

Specification forming part of Letters Patent No. 195,510, dated September 25, 1877; application filed February 17, 1877.

*To all whom it may concern:*

Be it known that I, JOHN B. JONES, of Brooklyn, in the county of Kings and State of New York, have invented a new and useful Improvement in Tinning Apparatus, of which the following is a specification:

Figure 1 is a top view of my improved apparatus. Fig. 2 is a vertical longitudinal section of the same taken through the line $x\,x$, Fig. 1. Fig. 3 is a detail section taken through the line $y\,y$, Fig. 1.

Similar letters of reference indicate corresponding parts.

The object of this invention is to improve the construction of the apparatus used for tinning sheet-iron plates, in such a way as to make the operation less laborious and quicker, and to produce better results.

The invention will first be described in connection with the drawing, and then pointed out in the claim.

I will first describe the ordinary apparatus, and will then describe my improvements and their effects.

In the operation of tinning, five vessels or compartments are used. Vessel 1 is partly filled with grease or flux, kept at a temperature of from one hundred and fifty to two hundred and twelve degrees, (150° to 212°,) and into it are placed the sheets when thoroughly cleaned, and while still wet, and are allowed to remain until all the water has been driven off or dissolved by the flux. The sheets are then removed from vessel 1 and are placed in vessel 2, which is nearly full of melted tin, and has from one to two inches of flux upon its surface. When the vessel 2 has been filled with goods the flux is all dipped off, and the goods are removed from vessel 2 and are placed in vessel 3. A portion of the flux from vessel 1 is again dipped into vessel 2, to prepare it to again receive the goods. This operation of dipping the flux back and forth from vessel 2 and vessel 1, alternately, has to be gone through with with each batch of goods, and is very laborious and disagreeable. The plates are removed from vessel 3, are laid upon its edge, and rapidly and thoroughly brushed with a hemp brush, to remove the coarse granular surface and make it smooth.

The plates are then dipped in vessel 4, to remove the brush-marks, and are placed in vessel 5. The vessels 3 and 4 contain melted tin with a little flux upon their surfaces. The vessel 5 is filled with flux only, at the temperature of melted tin, and the plates are allowed to remain in it until the excess of tin has drained off.

In my improved apparatus vessel 1 remains the same. The partition between vessels 2 and 3 is taken away, so that these become one vessel, and a shallow surface compartment, A, is secured in the upper part of the vessel, the lower edge of which extends down a little into the melted tin, so as to confine the flux contained in it and prevent it from entering vessel 2 3 and injuring the flux in said vessel 3. From the compartment A a small pipe, $a'$, leads into the vessel 1, so that the flux brought from vessel 1 by the goods may flow back into it.

With this construction the goods are pushed along in the vessel 2 3 without being raised out of the melted tin, and thus the necessity of dipping the flux back and forth is avoided.

The partition between vessels 2, 3, and 4 is also removed, some posts or a frame, B, being left to prevent the goods from passing from vessel 2 3 to vessel 4. In the upper part of vessel 4 is placed a shallow surface compartment or vessel, C, the lower part of which enters the melted tin, and which contains flux.

D are two spring-plates, which are inclined toward and then slightly curved from each other, and are slitted transversely from their lower edges, and are attached at their upper edges to two rods, E. The rods E pass through holes in the ends of the vessel D, and have screw-threads cut upon them, so that by adjusting the rods E the spring-plates D may be adjusted closer to or farther from each other, as required.

As the plates are removed from the vessel 2 3 they are passed down between the spring-plates D into vessel 4, through the flux that covers said spring-plates, the said plates D smoothing off the coarse and granular surface of the metal.

As the plates are removed from vessel 4 they are passed down into vessel 5, between two spring plates and rods, D E, exactly like those in vessel C, by which the surplus metal is removed.

By this construction the brushing the plates is wholly avoided, as is also the necessity of allowing them to remain and drain in vessel 5, and it also enables the plates to be handled two or three at a time. By these improvements the labor of tinning is greatly lessened, the time required is greatly shortened, as the operation is made continuous, and, at the same time, better work is done.

Having thus described my invention, I claim as new and desire to secure by Letters Patent—

An apparatus for coating metals, consisting of the vessels 1 2 3 4, No. 2 having a flux-compartment at the top, communicating by overflow with No. 1, Nos. 2 3 being unpartitioned and forming one vessel, and No. 4 having a surface flux-compartment with scraping-plates therein, as shown and described.

JOHN B. JONES.

Witnesses:
JAMES T. GRAHAM,
C. SEDGWICK.